United States Patent
Jiang

(10) Patent No.: US 10,078,230 B2
(45) Date of Patent: Sep. 18, 2018

(54) EYEGLASS LENSES WITH MINIMIZED EDGE VISIBILITY

(71) Applicant: Essilor International, Charenton-le-Pont (FR)

(72) Inventor: Peiqi Jiang, Plano, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/312,002

(22) PCT Filed: May 20, 2014

(86) PCT No.: PCT/IB2014/001289
§ 371 (c)(1),
(2) Date: Nov. 17, 2016

(87) PCT Pub. No.: WO2015/177585
PCT Pub. Date: Nov. 26, 2015

(65) Prior Publication Data
US 2017/0090213 A1    Mar. 30, 2017

(51) Int. Cl.
G02C 7/02 (2006.01)
G02C 1/06 (2006.01)
G02C 13/00 (2006.01)

(52) U.S. Cl.
CPC ............. *G02C 7/02* (2013.01); *G02C 13/001* (2013.01)

(58) Field of Classification Search
CPC ... G02C 1/06; G02C 7/04; G02C 7/02; G02C 13/001; A61B 3/117; A61B 3/125
USPC .................................................... 351/159.67
See application file for complete search history.

(56) References Cited

U.S. PATENT DOCUMENTS

| 5,755,786 A | 5/1998 | Woffinden et al. |
| 6,264,692 B1 | 7/2001 | Woffinden et al. |
| 2008/0024716 A1* | 1/2008 | Reichow ............... A42B 3/225 351/159.67 |
| 2010/0182700 A1 | 7/2010 | Thomas et al. |

(Continued)

FOREIGN PATENT DOCUMENTS

EP    2 607 884 A1    6/2013

OTHER PUBLICATIONS

International Search Report dated Jan. 22, 2015, in PCT/IB2014/001289 filed May 20, 2014.

*Primary Examiner* — William R Alexander
*Assistant Examiner* — Henry Duong
(74) *Attorney, Agent, or Firm* — Oblon, McClelland, Maier & Neustadt, L.L.P.

(57) ABSTRACT

Eyeglass lenses have at least a portion of their edge shaped to reflect light away from an eye of a wearer, such as the edge being disposed at an acute angle with respect to a principal axis of the lens, toward the back surface of the lens. Alternatively or additionally, the edge may include a plurality of edge surfaces disposed at an acute angle with respect to a principal axis of the eyeglass lens, toward the back surface of the eyeglass lens, or at least one edge surface may be disposed at an acute angle with respect to the front surface of the lens and at least one other edge surface may be disposed at an acute angle with respect to the back surface of the lens. As yet another alternative, the edge may be rounded with progressive angles to have an edge axis directed away from the wearer's eye.

13 Claims, 4 Drawing Sheets

(56) References Cited

U.S. PATENT DOCUMENTS

2013/0341523 A1 12/2013 Citek et al.
2014/0008543 A1 1/2014 Citek et al.

* cited by examiner

EYEGLASS LENSES WITH MINIMIZED EDGE VISIBILITY

BACKGROUND OF THE INVENTION

Field of the Invention

This invention relates generally to eyeglass lenses, more particularly to eyeglass lens edges shaped for greatly reduced light reflection.

Description of the Prior Art

Eyeglass wearers typically experience edge reflection light effect when wearing corrective lenses, especially in intense light environments and/or when wearing "rimless" or partially rimless glasses. This edge reflected light is due to the flat shape of the bottom edge of the lens, such as may be formed by a traditional wheel edging method. In this traditional wheel edging process, the obtained lens edge has a generally flat shape, especially in rimless lens designs. This flat shape will cause significant light reflection into the eye of the wearer. FIG. 1 illustrates fragmented prior art flat-edged lens 100 having flat bottom edge 101, and light 102 reflecting from flat bottom edge 101 into wearer's eye 103. Reflected light 111 will typically be even more intense if the lens edge is polished, such as in rimless lens shapes and when the wearer is under strong indoor light or under a night lamp. As a result, an eyeglass wearer will typically feel discomfort, and/or will typically be distracted, when wearing this type of flat-edged lens. The edge light reflection directs uncomfortable light into the wearer's eye and even limits the near vision area due to the edge reflection interference with the field of view. Such edge light reflection typically manifests as a dark edge along the bottom of the eyeglass lens, which may partially obscure the wearer's field of vision and/or distract the wearer.

Two known lens treatments related to lens edge improvement for eyeglasses include application of an anti-reflective coating on the edge of the lens so that edge can be somewhat less visible and applying color on an edge of the lens for aesthetic reasons. However, these treatments are not linked to edge light reflection improvement.

Edge treatments for other types of lenses, such as contact lenses, intraocular lenses and camera lenses typically deal with reducing the scatter, or diffraction, of light across the lens. Such edge treatments for contact, intraocular and/or camera lenses may include edge beveling, grooving, roughing, and/or other texturing. However, such treatments to address light scattering, or diffraction, of light across the lens do not reduce the visibility of the edges of these lenses for a user.

One common method of ophthalmic lens edge treatment involves putting a bevel shape on the edge of a lens. This bevel can be put on both surfaces of the lens. However, this kind of treatment is not useful for reducing edge light reflection and edge visibility.

SUMMARY

The present invention is directed to systems and methods which provide eyeglass lenses having a curved front surface, adapted to be away from an eye of a wearer, a curved back surface, adapted to be toward the eye of the wearer, and an edge extending between the front surface and the back surface. In accordance with various embodiments, at least a portion of the edge is selectively shaped to direct edge reflected light away from the eye of the wearer. In accordance with various embodiments, the portion of the edge shaped to direct edge reflected light away from the eye of the wearer may be disposed at an acute angle with respect to a principal axis of the eyeglass lens, toward the back surface of the eyeglass lens. This acute angle may be in a range of about 2 to about 45 degrees, more particularly, selected from a range of about 5 to about 20 degrees to accommodate facial anatomy of a wearer and/or a size of the lens and/or a frame the lens is to be mounted in. Alternatively or additionally, the portion of the edge shaped to direct edge reflected light away from the eye of the wearer may include a plurality of edge surfaces. These edge surfaces may also be disposed at an acute angle with respect to a principal axis of the eyeglass lens, toward the back surface of the eyeglass lens or they may comprise at least one edge surface disposed at an acute angle with respect to the front surface of the lens and at least one other edge surface disposed at an acute angle with respect to the back surface of the lens. In yet other alternative embodiments, the portion of the edge shaped to direct edge reflected light away from the eye of the wearer may be rounded with a plurality of progressive angles to have an edge axis directed away from the wearer's eye.

Thus, eyeglasses with minimized lens edge visibility may comprise a pair of lenses, such as described above with respect to various embodiments, and a frame mounting the lenses with a bottom edge of each lens shaped to direct edge reflected light away from the respective eye of the wearer not covered by the frame and, in accordance with various embodiments with portions of the edge of each lens that are disposed at an angle normal to a principal axis of the lens, or the like covered by the frame.

Hence, a method for providing eyeglasses with minimized lens edge visibility may call for selectively shaping at least a portion of an edge of an eyeglasses lens to direct edge reflected light away from a respective eye of a wearer of the eyeglasses, and mounting the eyeglasses lens in an eyeglasses frame with the portion of the edge of the eyeglass lens shaped to direct edge reflected light away from the respective eye of the wearer of the eyeglasses uncovered by the frame. This shaping may be carried out by wheel edging with a plurality of special angles or patterns and/or may result in any of the edge shape embodiments discussed above.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present invention is directed to an eyeglass lens edge shape design and a method to improve an eyeglass wearer's vision when wearing such eyeglass lenses. In accordance with various embodiments, an eyeglass lens edge is shaped, by way of example, to provide a certain angle. In accordance with embodiments of the present systems and methods, a corrective eyeglass lens includes a curved front surface, adapted to be away from an eye of a wearer, a curved back back surface, adapted to be toward the eye of the wearer, and an edge extending between the front and back surfaces. Therein, at least a portion of the edge, such as at least the bottom edge, and/or any edge that is intended to be maintained rimless, is shaped to direct edge reflected light away from the eye of the wearer. The resulting lenses can be used in ophthalmic lens applications, especially for people who wear rimless eyeglasses or informative lenses such as Google glass. Thus, in accordance with certain embodiments, the corrective eyeglass lens or informative lens is mounted in an eyeglass frame and the portion of the edge shaped to direct edge reflected light away from the eye of the wearer may not be covered by the frame.

Hence, "invisible" edge eyeglasses may, according to various embodiments, have a pair of these lenses having an edge where at least a portion of the edge is shaped to direct edge reflected light away from a respective eye of a wearer of the eyeglasses. As used herein, "invisible" and/or "vanishing" is intended to convey the impression that the subject lens edge is unnoticeable, nearly imperceptible, or the like. In such invisible or vanishing edge eyeglasses, a frame may mount the lenses with portions of the edge that are, by way of example, disposed at an angle normal to the principal axis of the lens are covered by the frame, and with portions of the edge of each lens that is shaped to direct edge reflected light away from the respective eye of the wearer is not covered by the frame.

Figure 1:
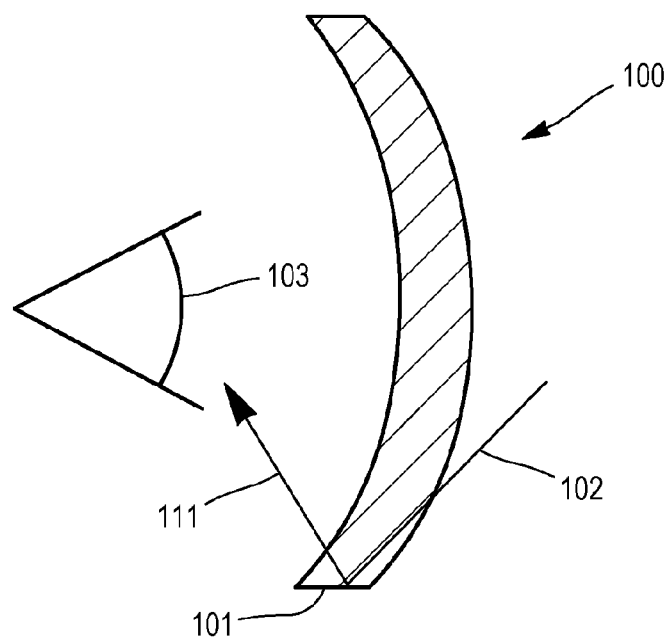
FIG. 1 diagrammatically illustrates a fragmented flat-edged prior art eyeglasses lens and reflection of light from the flat bottom edge into a wearer's eye.
Figure 2:
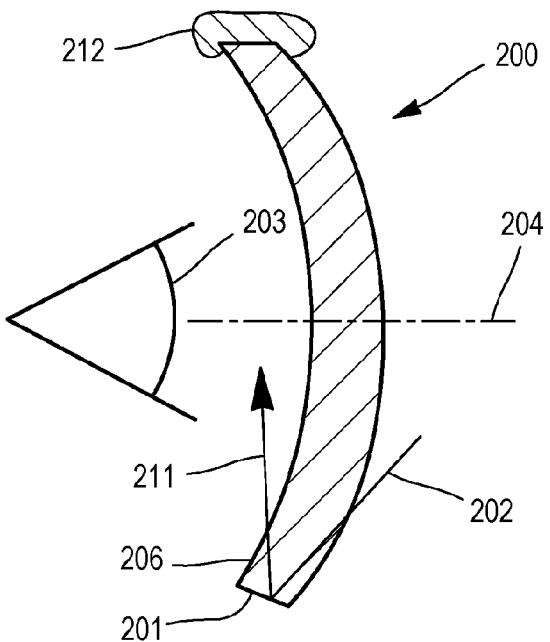
FIG. 2 diagrammatically illustrates a fragmented example eyeglass lens having an edge disposed at an acute angle with respect to a principal axis of the eyeglass lens, toward an eye side of the eyeglass lens, and reflection of light from the edge away from a wearer's eye, according to one embodiment.

FIG. 2 diagrammatically illustrates fragmented (generally in cross-section) example eyeglass lens 200 having bottom edge 201 shaped to reflect light 202 away from, or past, eye 203 of the wearer, wherein edge 201 is disposed at acute angle with respect to principal axis 204 of eyeglass lens 200, toward back surface 206 of eyeglass lens 200, according to one embodiment. This acute angle may be selected from a range of about two to about forty-five degrees, with respect to the principal axis 204 of eyeglass lens 200, toward back surface 206 of eyeglass lens 200. In certain embodiments, and more specifically, the acute angle may be selected from a range of about five to about twenty degrees, with respect to the principal axis 204 of eyeglass lens 200, toward back surface 206 of eyeglass lens 200, in a number of embodiments. The angle may be selected to accommodate facial anatomy of a wearer and/or a size of the lens and/or a frame the lens is to be mounted in, while providing the aforementioned reflection of edge reflected light away from the eye of the wearer. Hence, FIG. 2 also diagrammatically illustrates reflection 211 of light 202 from edge 201 away from, or past, wearer's eye 203, according to one embodiment. As shown, edge reflection light 211 does not strike wearer's eye 203, and hence a wearer will feel more comfortable and have greater area of vision, as discussed in greater detail below. In accordance with certain embodiments, eyeglass lens 200 may be mounted in eyeglass frame 212 and the portion of edge 201 disposed at an acute angle with respect to principal axis 204 of eyeglass lens 200, toward back surface 206 of eyeglass lens 200, may not be covered by frame 212.

Figure 3:
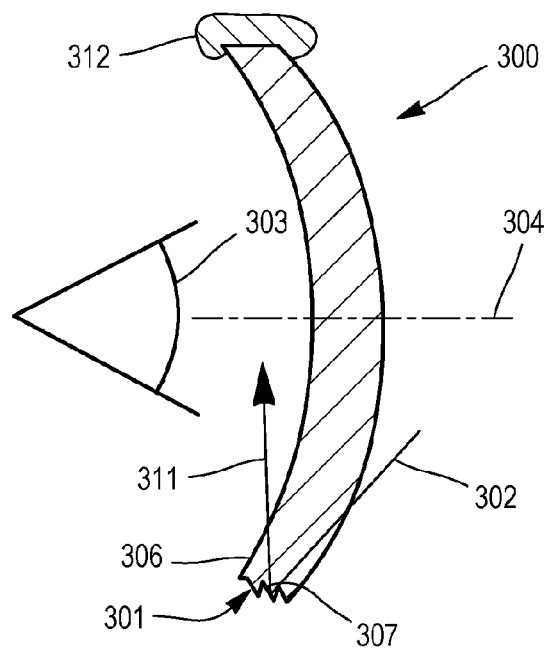
FIG. 3 diagrammatically illustrates a fragmented example eyeglass lens having an edge disposed at an acute angle with respect to a principal axis of the eyeglass lens, with a plurality of edge surfaces disposed at a further acute angle with respect to a principal axis of the eyeglass lens, toward the back surface of the eyeglass lens, and reflection of light from the edge away from a wearer's eye, according to one embodiment.

FIG. 3 diagrammatically illustrates fragmented (generally in cross-section) example eyeglass lens 300 having bottom edge 301 shaped to reflect light 302 away from, or past, eye 303 of the wearer, wherein edge 301 is disposed at a selected acute angle with respect to principal axis 304 of eyeglass lens 300, toward back surface 306 of the eyeglass lens, and further includes a plurality of edge surfaces 307 disposed at a further acute angle with respect to principal axis 304 of eyeglass lens 300, according to one embodiment. FIG. 3 also shows reflection 311 of light 302 from edge 301 away from, or past, wearer's eye 303, according to one embodiment. As shown, edge reflection light 311 does not strike the eye, and hence a wearer will feel more comfortable and have greater area of vision, as discussed in greater detail below. In accordance with certain embodiments, eyeglass lens 300 may be mounted in eyeglass frame 312 and the angled portion of edge 301 having a plurality of edge surfaces 307 may not be covered by frame 312.

Figure 4:
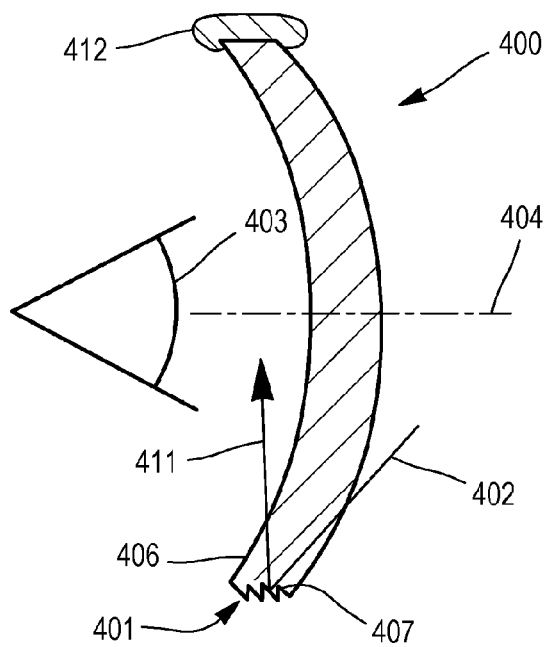
FIG. 4 diagrammatically illustrates a fragmented example eyeglass lens having an edge comprising a plurality of edge surfaces, each disposed at an acute angle with respect to a principal axis of the eyeglass lens, toward the back surface of the eyeglass lens, and reflection of light from the edge away from a wearer's eye, according to one embodiment.

FIG. 4 diagrammatically illustrates fragmented (generally in cross-section) example eyeglass lens 400 having bottom edge 401 shaped to reflect light 402 away from, or past, eye 403 of the wearer, wherein edge 401 comprises a plurality of edge surfaces 407, each disposed at an acute angle with respect to a principal axis 404 of eyeglass lens 400, toward back surface 406 of eyeglass lens 400, according to one embodiment. FIG. 4 also shows reflection 411 of light 402 from edge 401 away from, or past, wearer's eye 403, according to one embodiment. As shown, edge reflection light 411 does not strike the eye, and hence a wearer will feel more comfortable and have greater area of vision, as discussed in greater detail below. In accordance with certain embodiments, eyeglass lens 400 may be mounted in eyeglass frame 412 and the portion of edge 401 having a plurality of edge surfaces 407 may not be covered by frame 412.

Figure 5:
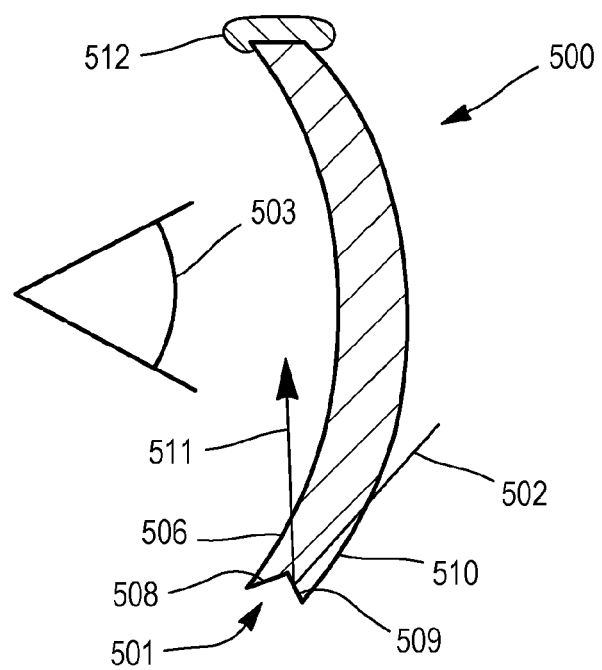
FIG. 5 diagrammatically illustrates a fragmented example eyeglass lens having an edge comprising a plurality of edge surfaces, one edge surface disposed at an acute angle with respect to the front surface of the eyeglass lens and one other edge surface disposed at an acute angle with respect to the back surface of the eyeglass lens, and reflection of light from the edge away from a wearer's eye, according to one embodiment.

FIG. 5 diagrammatically illustrates fragmented (generally in cross-section) example eyeglass lens 500 having bottom edge 501 shaped to reflect light 502 away from, or past, eye 503 of the wearer, wherein edge 501 comprises a plurality of edge surfaces 508 and 509, according to one embodiment. Therein, at least one edge surface (508) is disposed at acute angle with respect to back surface 506 of lens 500 and at least one other edge surface (509) disposed at acute angle with respect to front surface 510 of lens 500. FIG. 5 also diagrammatically illustrates reflection 511 of light 502 from edge 501 away from, or past, wearer's eye 503, according to one embodiment. As shown, edge reflection light 511 does not strike the eye, and hence a wearer will feel more comfortable and have greater area of vision, as discussed in greater detail below. In accordance with certain embodiments, eyeglass lens 500 may be mounted in eyeglass frame 512 and the portion of edge 501 having a plurality of edge surfaces (508 and 509) may not be covered by frame 512.

Figure 6:
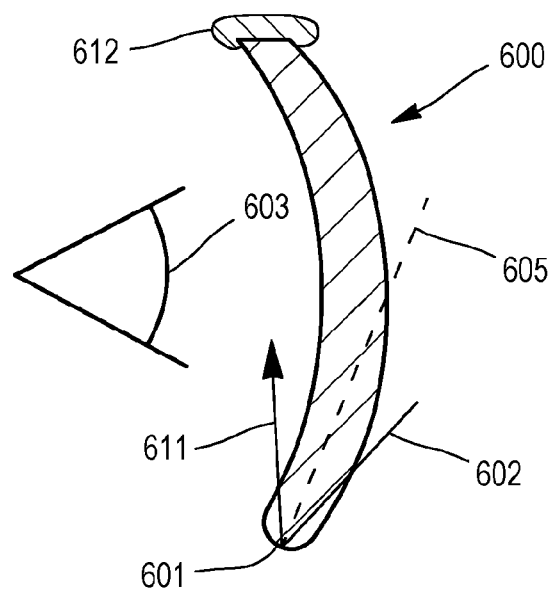
FIG. 6 diagrammatically illustrates a fragmented example eyeglass lens having an edge rounded with a plurality of continuous progressive angles to have an edge axis directed away from the wearer's eye, and reflection of light from the edge away from a wearer's eye, according to one embodiment.

FIG. 6 diagrammatically illustrates fragmented (generally in cross-section) example eyeglass lens 600 having bottom edge 601 shaped to reflect light 602 away from, or past, eye 603 of the wearer, wherein eyeglass lens edge 601 is rounded with continuous progressive angles to have edge axis 605 directed away from, or past, wearer's eye 603, according to one embodiment.

Orientation of axis 605 of rounded edge 601 away from, or past, wearer's eye 603 reflects light 602 striking rounded edge 601 away from, or at least past, eye 603 of the wearer. Accordingly, FIG. 6 also diagrammatically illustrates reflection 611 of light 602 from edge 601 away from, or past, wearer's eye 603, according to one embodiment. As shown, edge reflection light 611 does not strike wearer's eye 603, and hence a wearer will feel more comfortable and have greater area of vision, as discussed in greater detail below. In accordance with certain embodiments, eyeglass lens 600 may be mounted in eyeglass frame 612 and the portion of edge 601 rounded to have edge axis 605 directed away from wearer's eye 603 is not covered by frame 612.

Implementation of a method for providing edge eyeglasses might include shaping at least a portion of an edge of an eyeglasses lens to direct edge reflected light away from a respective eye of a wearer of the eyeglasses, and mounting the eyeglasses lens in an eyeglasses frame with the portion of the edge of the eyeglass lens shaped to direct edge reflected light away from the eye of the wearer uncovered by the frame. The shaping maybe carried out using wheel edging with a plurality of special angles and patterns and/or may include shaping the portion of the edge shaped to direct edge reflected light away from the respective eye of the wearer at an acute angle with respect to the principal axis of the lens, such as seen in FIG. 2 above. Alternatively, the shaping may shape the portion of the edge shaped to direct edge reflected light away from the respective eye of the wearer with a plurality of edge surfaces, such as seen in FIGS. 3 through 5 above. In other alternative embodiments, the shaping may comprise rounding the portion of the edge shaped to direct edge reflected light away from the respective eye of the wearer to have an axis directed away from the wearer's eye, as seen in FIG. 6 above.

Figure 7:
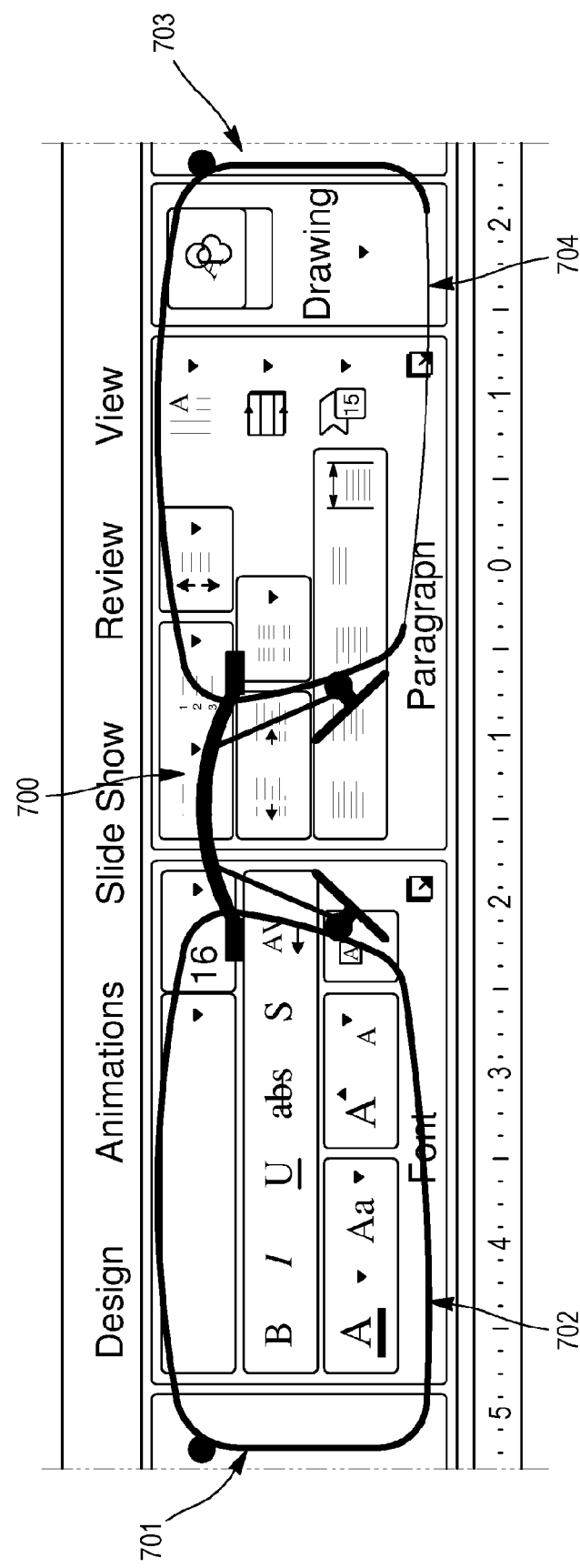
FIG. 7 shows a wearer's perspective view through eyeglasses in which the left eyeglass lens has a traditional flat bottom edge and the right eyeglasses lens has a shaped bottom edge to direct edge reflected light away from the eye of the wearer, in accordance with various embodiments.

In an example implementation based on the principles shown in FIG. 2 and discussed above with respect to FIG. 2, the right lens of a pair of rimless Progressive Addition Lens (PAL) glasses with addition of +1.25 Diopter was edge polished by a normal wheel edging equipment to provide a ~15° angle toward the eye side. That is, the lens edge was edge polished to form an acute angle with respect to a principal axis of the eyeglass lens. The obtained right lens had very little reflection light coming from the lens edge, while the left lens with traditional flat edge showed significant reflection light that can be seen by the wearer's eye. FIG. 7 shows a wearer's perspective view through eyeglasses 700, in which left eyeglass lens 701 has a traditional flat bottom edge 702 and right eyeglasses lens 703 has minimized visibility bottom edge 704, shaped to direct edge reflected light away from the eye of the wearer, in accordance with various embodiments, such as the embodiments discussed above, with respect to FIGS. 2 through 6.

Benefits provided in accordance with various embodiments of the present systems and methods for providing special eyeglasses lens edge shape(s) can be easily seen by wearers. By slightly changing the lens bottom edge shape from flat edge to a certain degree angle shape (e.g. >5° toward to the eye side), the edge light reflection is greatly reduced and the glass is more comfortable to the wearer. Additionally, the near sight vision area of the lens is enlarged thanks to less edge light reflection interference. Thanks to this edge shape, the wearer feels not only more comfortable vision, compared to the traditional flat edge left lens, but also experiences greater vision area in near sight. The present systems and methods are especially well adapted for use with rimless PAL lenses or reading glass lenses and the like.

Consistent with the present systems and methods, edge shape design for less reflection light may also be obtained through other similar approaches based on the principles discussed above, such as, by way of example, with multi-angle edges, edges defining micro-structures or patterns, roughened edges, dark dye or ink deposited on edges, or the like, for reducing light reflected towards the eyes.

Hence, although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An eyeglass lens comprising:
   a curved front surface, adapted to be away from an eye of a wearer;
   a curved back surface, adapted to be toward the eye of the wearer; and
   an edge extending between the front surface and the back surface, at least a portion of the edge selectively shaped to direct edge reflected light away from the eye of the wearer; wherein the portion of the edge selectively shaped to direct edge reflected light away from the eye of the wearer is disposed at an acute angle with respect to a principal axis of the eyeglass lens, toward the back surface of the eyeglass lens, wherein the acute angle is selected from a range of about 5 to about 20 degrees to accommodate facial anatomy of a wearer and/or a size of the lens and/or a frame the lens is to be mounted in.

2. The eyeglass lens of claim 1, wherein the portion of the edge shaped to direct edge reflected light away from the eye of the wearer further comprises a plurality of edge surfaces disposed at a further acute angle with respect to a principal axis of the eyeglass lens, toward the back surface of the eyeglass lens.

3. The eyeglass lens of claim 1, wherein the portion of the edge shaped to direct edge reflected light away from the eye of the wearer comprises a plurality of edge surfaces.

4. The eyeglass lens of claim 3, wherein each of the edge surfaces is disposed at an acute angle with respect to a principal axis of the eyeglass lens, toward the back surface of the eyeglass lens.

5. The eyeglass lens of claim 3, wherein at least one edge surface is disposed at an acute angle with respect to the front surface and at least one other edge surface is disposed at an acute angle with respect to the back surface.

6. The eyeglass lens of claim 1, wherein the portion of the edge shaped to direct edge reflected light away from the eye of the wearer is rounded with progressive angles to have an edge axis directed away from the wearer's eye.

7. A method comprising:
   shaping at least a portion of an edge of an eyeglasses lens to direct edge reflected light away from a respective eye of a wearer of the eyeglasses; and
   mounting the eyeglasses lens in an eyeglasses frame with the portion of the edge of the eyeglass lens shaped to direct edge reflected light away from the respective eye of the wearer of the eyeglasses uncovered by the frame;
   wherein said shaping is performed such that the portion of the edge shaped to direct edge reflected light away from the eye of the wearer is disposed at an acute angle with respect to a principal axis of the eyeglass lens, toward the back surface of the eyeglass lens, and
   wherein said shaping further comprising selecting the acute angle from a range of about 5 to about 20 degrees to accommodate facial anatomy of a wearer and/or a size of the lens and/or a frame the lens is to be mounted in.

8. The method of claim 7, wherein the shaping further comprises shaping the portion of the edge shaped to direct edge reflected light away from the respective eye of the wearer at an acute angle with respect to a principal axis of the eyeglass lens, toward the back surface of the eyeglass lens.

9. The method of claim 8, wherein shaping the portion of the edge shaped to direct edge reflected light away from the eye of the wearer further comprises shaping a plurality of edge surfaces disposed at a further acute angle with respect to a principal axis of the eyeglass lens, toward an eye side of the eyeglass lens.

10. The method of claim 7, wherein the shaping further comprises shaping the portion of the edge shaped to direct edge reflected light away from the respective eye of the wearer with a plurality of edge surfaces.

11. The method of claim 10, wherein each of the edge surfaces is shaped at an acute angle with respect to a principal axis of the eyeglass lens, toward an eye side of the eyeglass lens.

12. The method of claim 10, wherein at least one edge surface is shaped at an acute angle with respect to the front surface and at least one other edge surface is shaped at an acute angle with respect to the back surface.

13. Eyeglasses with minimized lens edge visibility comprising:
   a pair of lenses, each comprising:
      a curved front surface, adapted to be away from an eye of a wearer;
      a curved back surface, adapted to be toward the eye of the wearer; and
      an edge extending between that front surface and the back surface, at least a portion of the edge at a bottom of the lens shaped to direct edge reflected light away from a respective eye of the wearer of the eyeglasses; and
   a frame mounting the lenses with bottom edges of each lens shaped to direct edge reflected light away from the respective eye of the wearer not covered by the frame,
   wherein the portion of the edge shaped to direct edge reflected light away from the eye of the wearer is disposed at an acute angle with respect to a principal axis of each eyeglass lens, toward the back surface of each eyeglass lens, wherein the acute angle is selected from a range of about 5 to about 20 degrees to accommodate facial anatomy of a wearer and/or a size of the lens and/or a frame the lens is to be mounted in.

* * * * *